(12) United States Patent
Hæggström et al.

(10) Patent No.: US 10,839,558 B2
(45) Date of Patent: Nov. 17, 2020

(54) ARTIFACT FOR DETERMINING RESOLUTION OF IMAGING BASED ON ELECTROMAGNETIC RADIATION AND/OR MECHANICAL WAVES

(71) Applicant: NANOFORM FINLAND OYJ, Helsinki (FI)

(72) Inventors: Edward Hæggström, Helsinki (FI); Ivan Kassamakov, Helsinki (FI); Anton Nolvi, Järvenpää (FI); Niklas Sandler, Helsinki (FI); Tapani Viitala, Espoo (FI); Johan Nyman, Åbo (FI)

(73) Assignee: NANOFORM FINLAND OYJ, Helsinki (FI)

( * ) Notice: Subject to any disclaimer, the term of this patent is extended or adjusted under 35 U.S.C. 154(b) by 150 days.

(21) Appl. No.: 16/301,279

(22) PCT Filed: May 8, 2017

(86) PCT No.: PCT/FI2017/050353
§ 371 (c)(1),
(2) Date: Nov. 13, 2018

(87) PCT Pub. No.: WO2017/194832
PCT Pub. Date: Nov. 16, 2017

(65) Prior Publication Data
US 2020/0320741 A1    Oct. 8, 2020

(30) Foreign Application Priority Data

May 10, 2016    (FI) .................................. 20165400

(51) Int. Cl.
*G01B 9/02*    (2006.01)
*G06T 7/80*    (2017.01)
(Continued)

(52) U.S. Cl.
CPC ............ *G06T 7/80* (2017.01); *G01B 9/02072* (2013.04); *G01B 11/0675* (2013.01); *G01S 7/5205* (2013.01); *G01S 15/8906* (2013.01)

(58) Field of Classification Search
CPC ... G06T 7/80; G01B 11/0675; G01B 9/02072; G01S 7/5205; G01S 15/8906
See application file for complete search history.

(56) References Cited

U.S. PATENT DOCUMENTS 4,582,427 A    4/1986 Hutchin
4,818,725 A *  4/1989 Lichtel, Jr. ............ H01L 21/033
                                          148/DIG. 122
(Continued)

FOREIGN PATENT DOCUMENTS

CN    104777239 A    7/2015
DE    103 56 829 B3    8/2005
(Continued)

OTHER PUBLICATIONS

Claudiu L Giusca et al: "Calibration of the scales of areal surface topography measuring instruments: part 3. Resolution", Measurement Science and Technology, IOP, Bristol, GB, vol. 24, No. 10, Sep. 10, 2013 (Sep. 10, 2013), pp. 105010, XP020251335, ISSN: 0957-0233, [retrieved on Sep. 10, 2013], DOI: 10.1088/0957-0233/24/10/105010.
(Continued)

*Primary Examiner* — Jonathan R Messmore
(74) *Attorney, Agent, or Firm* — Nixon & Vanderhye (57) ABSTRACT

An artifact for determining resolution of imaging based on electromagnetic radiation, mechanical waves, or both is presented. The artifact includes a substrate and layers on top of the substrate. The layers include organic material and are stacked on each other in a partially overlapping way so that an edge of a first one of the layers is arranged to intersect with an edge of a second one of the layers. The layers
(Continued)

constitute a three-dimensional surface topography where a groove defined by the edges of the first and second ones of the layers is tapering towards a point of intersection between the edges. The resolution is a minimum width of the tapering groove which is revealed by the imaging so that a predetermined criterion is fulfilled.

27 Claims, 8 Drawing Sheets

(51) Int. Cl.
*G01S 7/52* (2006.01)
*G01S 15/89* (2006.01)
*G01B 11/06* (2006.01)

(56) References Cited

U.S. PATENT DOCUMENTS

| | | | |
|---|---|---|---|
| 5,912,506 A * | 6/1999 | Colgan | H01L 23/49866 257/750 |
| 6,490,033 B1 | 12/2002 | Coult et al. | |
| 7,262,842 B2 | 8/2007 | Ermantraut et al. | |
| 2004/0005243 A1 | 1/2004 | Mulhern et al. | |
| 2007/0159624 A1 | 7/2007 | Resch-Gener et al. | |
| 2016/0124280 A1* | 5/2016 | Park | G02F 1/13394 349/43 |

FOREIGN PATENT DOCUMENTS

| | | |
|---|---|---|
| FR | 2 703 448 A1 | 10/1994 |
| JP | 2005032890 A | 2/2005 |
| WO | 2009012255 A2 | 1/2009 |

OTHER PUBLICATIONS

Gabriel C. Birch et al: "Sinusoidal Siemens star spatial frequency response measurement errors due to misidentified target centers", Optical Engineering., vol. 54, No. 7, Jul. 23, 2015 (Jul. 23, 2015), Bellingham, pp. 074104, XP055392367, ISSN: 0091-3286, DOI: 10.1117/1.OE.54.7.074104.

FR Search Report, dated Dec. 20, 2016, from corresponding FI 20165400 application.

International Search Report, dated Aug. 2, 2017, from corresponding PCT/FI2017/050353 application.

* cited by examiner

ARTIFACT FOR DETERMINING RESOLUTION OF IMAGING BASED ON ELECTROMAGNETIC RADIATION AND/OR MECHANICAL WAVES

TECHNICAL FIELD

The disclosure relates to an artifact for determining the resolution of imaging that is based on electromagnetic radiation and/or on mechanical waves. Furthermore, the disclosure relates to a method for determining the resolution of imaging based on electromagnetic radiation and/or mechanical waves, to a method for calibrating imaging based on electromagnetic radiation and/or mechanical waves, and to a system for imaging based on electromagnetic radiation and/or mechanical waves.

BACKGROUND

In microscopy and other electromagnetic radiation-based imaging as well as in ultrasound and other mechanical wave-based imaging, important metrics include typically the magnification, the field-of-view "FOV", the depth of field, and the resolution. While many of these metrics are easy to define in an unambiguous manner, the determination of the resolution can be problematic. In standards of the International Standardization Organization "ISO", the ability of an imaging instrument to resolve spacing and height has been termed "lateral period limit" and is defined as the spatial period of a sinusoidal profile at which the height response of the instrument is reduced to 50%. The lateral period limit that represents the resolution can be determined by using an artifact having a three-dimensional "3D" surface topography with the aid of which the spatial frequency corresponding to the 50% height response can be found. An artifact can be for example a Siemens star which features a pattern of radially oriented areas which coincide at the center of the star and which taper towards the center. The radially oriented areas are alternately lower and higher so that the surface height varies periodically when a point of observation travels along a circle circumscribing the center. The lateral period of the height variation gets smaller when the radius of the circle is reduced. The use of the Siemens star for determining the resolution of an optical system is discussed e.g. in the publication Birch and Griffing: "*Sinusoidal Siemens star spatial frequency response measurement errors due to misidentified target centers*", Optical Engineering 54(7), 074104, July 2015.

In many cases, the 3D surface topography of an artifact is created by cutting and/or etching. Suitable materials for artifacts made by cutting and/or etching are for example silicon "Si", zirconium "Zr", and many metals. Cutting as a method of manufacture has however some limitations. One challenge related to the cutting is that the radius of lateral curvature in a cut 3D surface topography has a lower limit which limits the suitability of the cutting as a method of manufacture for artifacts where a very fine-pitch 3D surface topography is needed. Furthermore, samples to be examined with imaging based on electromagnetic radiation and/or mechanical waves are often composed of organic materials. Thus, the material properties of artifacts made by the cutting and/or etching may differ significantly from the material properties of samples to be examined. For example, the refractive index and/or the acoustic impedance of the sample material may differ significantly from that of the material of an artifact made by cutting and/or etching. In many cases, the refractive index and/or the acoustic impedance play a significant role in imaging based on electromagnetic radiation and/or mechanical waves. Different refractive indexes and/or acoustic properties in the sample and the artifact may distort a calibration based on the artifact and used for improving the quality of the imaging.

SUMMARY

The following presents a simplified summary to provide a basic understanding of some aspects of different invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying and non-limiting embodiments of the invention.

In accordance with the invention, there is provided a new artifact for determining the resolution of imaging that is based on electromagnetic radiation and/or mechanical waves. The imaging can be, for example but not necessarily, interferometry based on interference between electromagnetic or mechanical waves reflected from an object being imaged and other electromagnetic or mechanical waves reflected from a reference reflector. The interferometry based on electromagnetic radiation can e.g. be white-light interferometry "WLI", white-light polarization interferometry "WLPI", stroboscopic scanning white-light interferometry "SSWLI" and/or stroboscopic scanning white-light polarization interferometry "SSWLPI". Furthermore, the imaging based on electromagnetic radiation can represent a low coherence technique, a confocal technique, a phase shifting technique, an ellipsometry imaging technique, and/or a surface plasmon resonance imaging "SPRi" technique. The interferometry based on mechanical waves can be e.g. acoustic interference microscopy. Furthermore, the imaging based on mechanical waves can be e.g. ultrasound imaging such as e.g. ultrasound microscopy. An example of imaging that is based on both electromagnetic radiation and mechanical waves is laser-ultrasonic imaging where laser is used for exciting mechanical vibrations for imaging.

It is, however, to be understood that the present invention is not limited to the above-mentioned imaging techniques but the invention is also applicable with imaging techniques which are not mentioned above.

An artifact according to the invention comprises:
a substrate, and
layers on top of the substrate.

The layers comprise organic material and at least two of the layers are stacked on each other in a partially overlapping way so that an edge of a first one of the layers is arranged to intersect with an edge of a second one of the layers. The layers constitute a 3D surface topography where, when the artifact is seen along a direction perpendicular to the layers, a groove defined by the above-mentioned edges of the first and second ones of the layers tapers towards a point of intersection between the edges.

The substrate of the artifact can be made of e.g. highly ordered pyrolytic graphite "HOPG", and the above-mentioned layers of the artifact can be e.g. Langmuir-Blodgett films "LBF". The LBFs can be manufactured in a known way to have a constant thickness within a range from 0.5 nm to 4 nm, e.g. 2.5 nm. Consequently, the thickness profile i.e. the 3D surface topography of the artifact can be controlled with steps of 0.5 nm-4 nm, e.g. 2.5 nm by controlling the number of LBFs stacked on each other at each point of the artifact.

An artifact of the kind described above can be manufactured e.g. in the following way. First, one takes a substrate of HOPG and peels off, in a known manner, a sufficient number of HOPG layers to have a desired thickness. A more controlled thickness can be achieved by using electron-beam lithography to cut away HOPG material. Next, a LBF created from a lipid film, e.g. stearic acid or phopshatidylcholine, is deposited on top of the HOPG substrate by immersing the HOPG substrate, in a known manner, through a monolayer residing on a sub-phase containing monolayer stabilizing counter ions e.g. Uranyl acetate or $CdCl_2$. The desired thickness profile can be achieved by immersing the artifact being manufactured in an appropriate position into the sub-phase for each of the LBF layers so that the artifact is tilted and/or rotated so as to coat a desired area of the artifact with an LBF layer.

The above-mentioned partially overlapping first and second layers having the intersecting edges can be manufactured e.g. by using a standard Langmuir Blodget trough that contains one or more suitable LBF liquids. The substrate is cleaned, dried, and immersed into the trough along a vertical trajectory so that the part of the surface of the substrate which is wanted to be covered by the first layer is immersed into the LBF liquid. The substrate is then retracted all the way out of the LBF liquid. The substrate is then turned to a different position and immersed into the LBF liquid so that, this time, the part of the surface of the substrate and the part of the surface of the first layer which are wanted to be covered by the second layer are immersed into the LBF liquid. The substrate is then retracted all the way out of the LBF liquid. As a result, one has an artifact that comprises two partially overlapping LBF layers whose edges are intersecting with each other. Optionally, one or more base layers can be deposited before the above-mentioned LBF layers are created. By repeating the procedure one can produce more LBF layers on the artifact.

Unlike artifacts of many other kinds, the above-described artifact has optical and mechanical properties close to those of many biological tissues. This is advantageous since differences in optical and/or mechanical properties between the sample and the artifact may distort the image. Furthermore, the artifact can be controlled to have a desired thickness profile with accurately known dimensions since the thickness profile is a natural and inherent result of the manufacturing process of the artifact.

The preferential materials used for preparing an artifact by the Langmuir Blodgett "LB" deposition are fatty acids, fatty alcohols, fatty amines, phospholipids, sterols, and any amphiphilic derivatives of these because these can be used to form even single layers of precise thicknesses between 2-4 nm. The preferential layer thickness can be produced by repetitive multiple deposition of these flat single layers by the LB technique. Additionally, these materials allow producing layers having precise thicknesses and being free of labeling agents, which allows e.g. label-free calibration with the aid of the produced artifact. Polymer LB films usually form thicker layers than 2-4 nm and are often not as smooth and even as those made from the above-mentioned fatty acids, fatty alcohols, fatty amines, phospholipid monolayers/multilayers, sterols, and amphiphilic derivatives of these. Some polymer layers can also be very difficult or even impossible to deposit by the LB technique due to their stiffness.

In accordance with the invention, there is also provided a new method for determining the resolution of imaging based on electromagnetic radiation and/or mechanical waves. The method comprises:

producing one or more imaging results based on electromagnetic or mechanical waves received from an artifact according to the invention, the artifact having a pre-determined 3D surface topography comprising a tapering groove, and determining a minimum width of the tapering groove which is revealed by the one or more imaging results so that a pre-determined criterion is fulfilled, the determined minimum width being indicative of the resolution of the imaging based on electromagnetic radiation and/or mechanical waves.

The above-mentioned criterion can be e.g. a requirement that the one or more imaging results reveal at least a pre-determined portion of the depth of the tapering groove. In a case where the pre-determined portion is 50%, the criterion corresponds substantially to the standard 25718 of the International Standardization Organization "ISO".

In accordance with the invention, there is also provided a new method for calibrating imaging based on electromagnetic radiation and/or mechanical waves. The method comprises:

producing one or more first imaging results based on first electromagnetic or mechanical waves received from an artifact according to the invention, the artifact having a pre-determined 3D surface topography, forming calibration data based on the one or more first imaging results and the pre-determined 3D surface topography of the artifact, and correcting, with the aid of the calibration data, one or more second imaging results produced based on second electromagnetic or mechanical waves received from a sample to be imaged.

In accordance with the invention, there is also provided a new system for imaging based on electromagnetic radiation and/or mechanical waves. The system comprises:

an artifact according to the invention, the artifact having a pre-determined 3D surface topography comprising a tapering groove, and an imaging device for producing one or more first imaging results based on first electromagnetic or mechanical waves received from the artifact and for producing one or more second imaging result based on second electromagnetic or mechanical waves received from a sample to be imaged.

A system according to an exemplifying and non-limiting embodiment of the invention comprises processing equipment for determining a minimum width of the tapering groove which is revealed by the one or more first imaging results so that a pre-determined criterion is fulfilled. The determined minimum width is indicative of the resolution of the imaging based on electromagnetic radiation and/or mechanical waves.

A system according to an exemplifying and non-limiting embodiment of the invention comprises processing equipment for forming calibration data based on the one or more first imaging results and the pre-determined 3D surface topography of the artifact, and for correcting, with the aid of the calibration data, the one or more second imaging results.

A number of exemplifying and non-limiting embodiments of the invention are described in accompanied dependent claims.

Exemplifying and non-limiting embodiments of the invention both as to constructions and to methods of operation, together with additional objects and advantages thereof, are best understood from the following description of specific exemplifying embodiments when read in connection with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

Figure 1A:
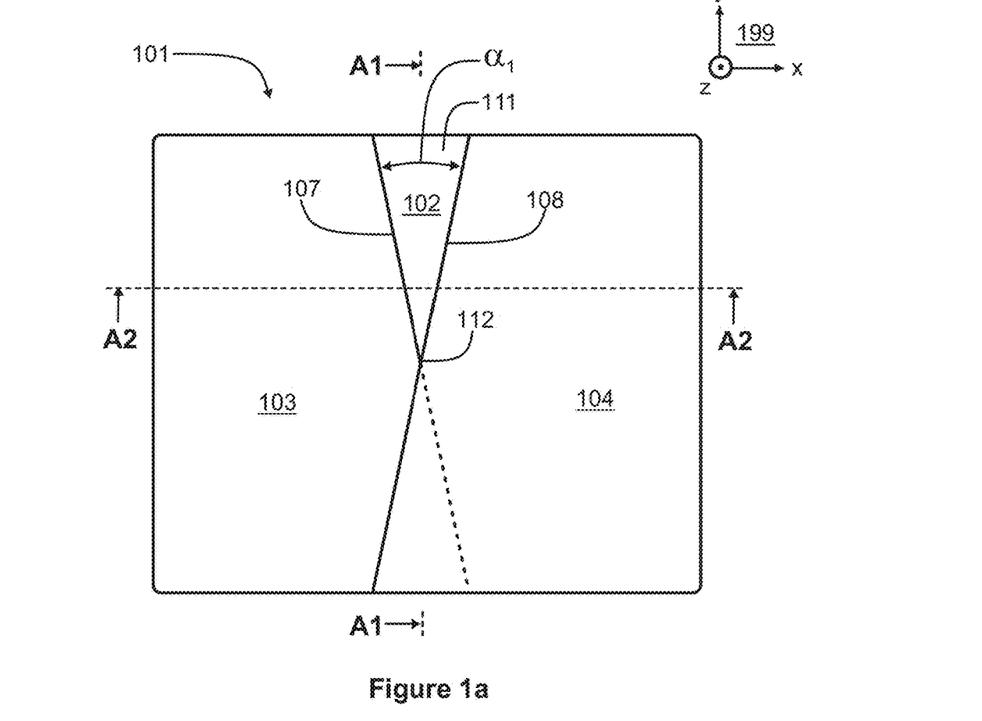
FIGS. 1a, 1b, and 1c illustrate an artifact according to an exemplifying and non-limiting embodiment of the invention.
Figure 1B:
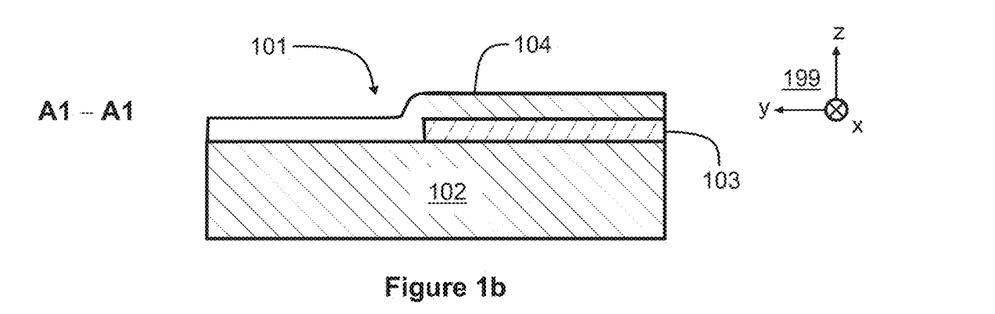
Figure 1C:
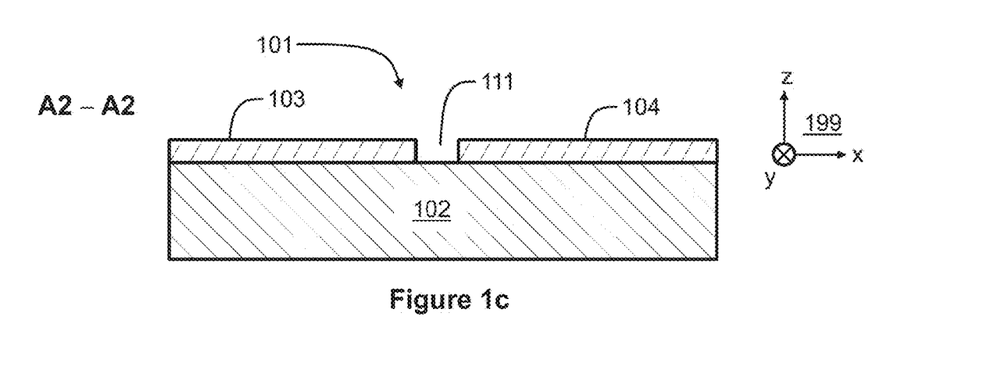

FIG. 1a shows a top view of an artifact 101 according to an exemplifying and non-limiting embodiment of the invention. FIG. 1b shows a view of a section taken along a line A1-A1 shown in FIG. 1a, and FIG. 1c shows a view of a section taken along a line A2-A2 shown in FIG. 1a. In FIG. 1b, the section plane is parallel with the yz-plane of a coordinate system 199. In FIG. 1c, the section plane is parallel with the xz-plane of the coordinate system 199. The artifact 101 comprises a substrate 102 and layers 103 and 104 on top of the substrate. The layers 103 and 104 are stacked on each other in a partially overlapping way so that an edge 107 of the layer 103 is arranged to intersect with an edge 108 of the layer 104. The layer 103 is on the substrate 102, and the layer 104 is partially on the substrate 102 and partially on the layer 103. In FIG. 1a, a part of the edge 107 which is covered by the layer 104 is depicted with a dashed line.

As seen in FIGS. 1a-1c, the layers 103 and 104 together with the substrate 102 constitute a three-dimensional "3D" surface topography where a groove 111 defined by the above-mentioned edges 107 and 108 tapers towards the point of intersection 112 between the edges 107 and 108. The angle $\alpha_1$ that is between the edges 107 and 108 and opens towards the groove 111 can be advantageously in the range from 5 degrees to 90 degrees, more advantageously in the range from 7 degrees to 20 degrees, and yet more advantageously in the range from 8 degrees to 12 degrees. The layers 103 and 104 comprise organic material in order to achieve a situation in which appropriate material properties of the artifact 101 are sufficiently close to appropriate material properties of biological or synthetic organic samples to be examined. Organic materials are defined in modern chemistry as carbon-based compounds, originally derived from living organisms but now including lab-synthesized versions as well. The layers 103 and 104 are advantageously Langmuir-Blodgett films "LBF". The substrate 102 can be made of e.g. highly ordered pyrolytic graphite "HOPG", $SiO_2$, metal, metal oxide, or silicon.

Figure 2A:
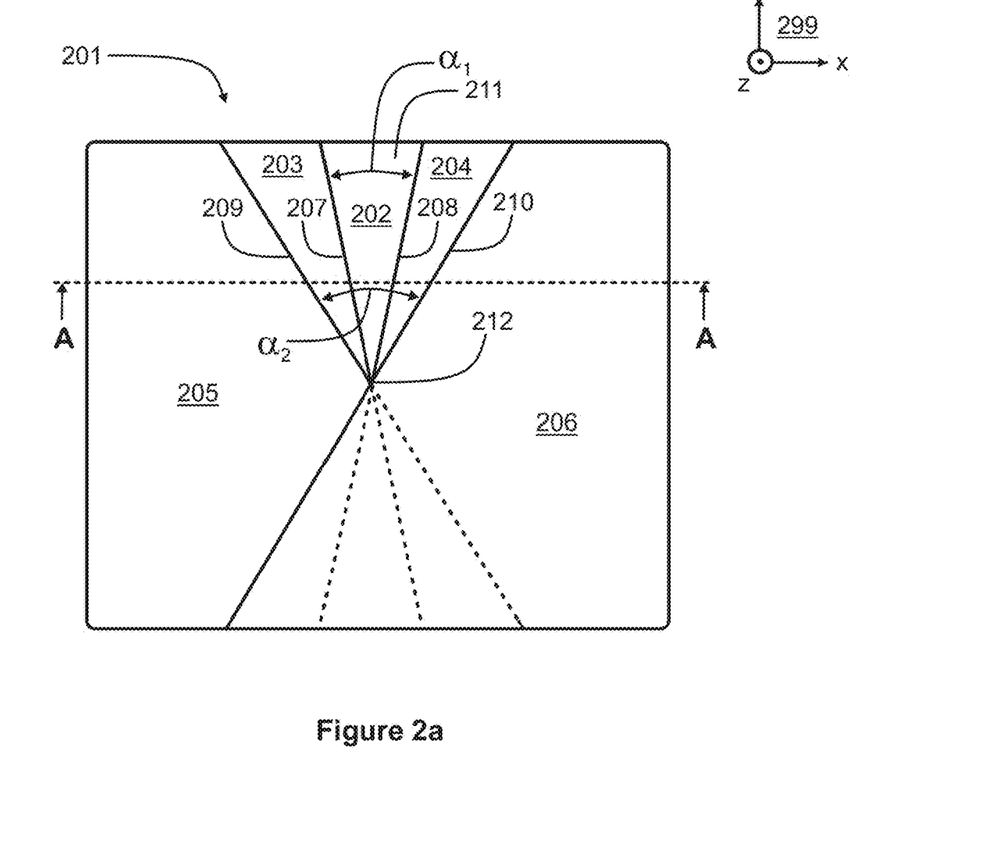
FIGS. 2a and 2b illustrate an artifact according to an exemplifying and non-limiting embodiment of the invention.
Figure 2B:
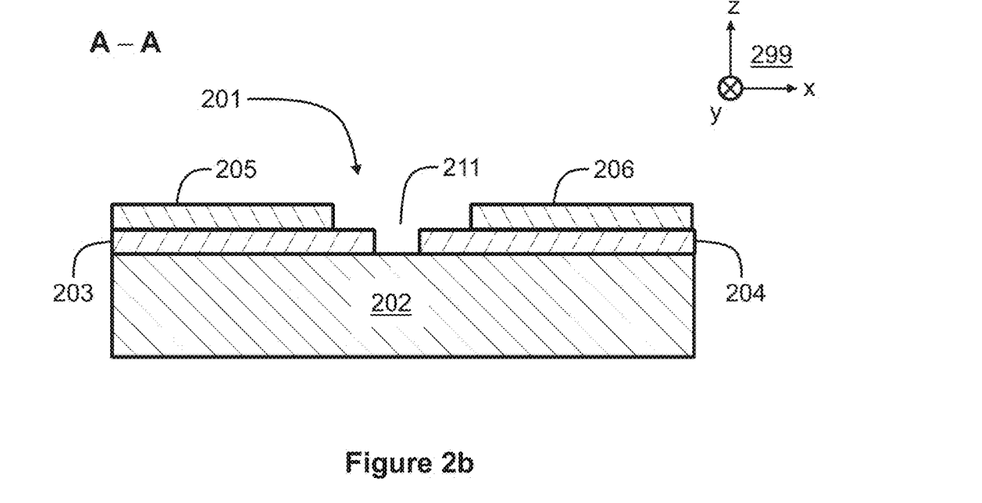

FIG. 2a shows a top view of an artifact 201 according to an exemplifying and non-limiting embodiment of the invention. FIG. 2b shows a view of a section taken along a line A-A shown in FIG. 2a. In FIG. 2b, the section plane is parallel with the xz-plane of a coordinate system 299. The artifact 201 comprises a substrate 202 and layers 203, 204, 205, and 206 on top of the substrate. The layers 203-204 are stacked on each other in a partially overlapping way so that edges 207, 208, 209, and 210 of the layers 203-206 are arranged to intersect with each other at a point of intersection 212 as illustrated in FIG. 2a. The first one of the layers 203 is on the substrate 202, the second one of the layers 204 is partially on the substrate and partially on the layer 203, the third one of the layers 205 is partially on the layer 203 and partially on the layer 204, and the fourth one of the layers 206 is partially on the layer 204 and partially on the layer 205. In FIG. 2a, parts of the edges 207-209 which are covered by one or more of the layers 204-206 are depicted with dashed lines.

As seen in FIGS. 2a and 2b, the layers 203-206 together with the substrate 202 constitute a 3D surface topography where a groove 211 defined by the above-mentioned edges tapers towards the point of intersection 212 between the edges 207-210. As seen in FIG. 2a, the first angle $\alpha_1$ that is between the edges 207 and 208 and opens towards the groove 211 is, when the artifact is seen along the direction perpendicular to the layers, inside the second angle $\alpha_2$ that is between the edges 209 and 210 and opens towards the groove 211. Therefore, in the exemplifying artifact 201 illustrated in FIGS. 2a and 2b, the groove 211 has a step-shaped cross-sectional profile as illustrated in FIG. 2b.

In the exemplifying artifact 201 illustrated in FIGS. 2a and 2b, the point of intersection between the edges 207 and 208 is, when seen along a direction perpendicular to the layers 203-206, substantially at a same location as the point of intersection between the edges 209 and 210. This is, however, not the only possible choice. It is, for example, also possible that the point of intersection between the edges 207 and 208 is, when seen along a direction perpendicular to the layers 203-206, at a different place than the point of intersection between the edges 209 and 210.

Figure 3A:
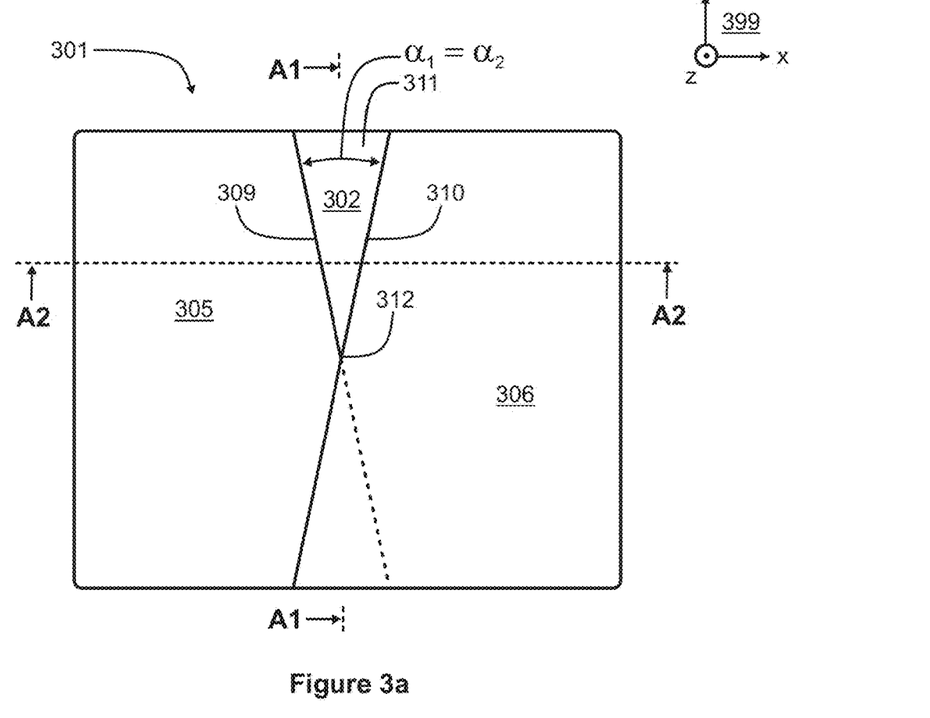
FIGS. 3a, 3b and 3c illustrate an artifact according to an exemplifying and non-limiting embodiment of the invention.
Figure 3B:
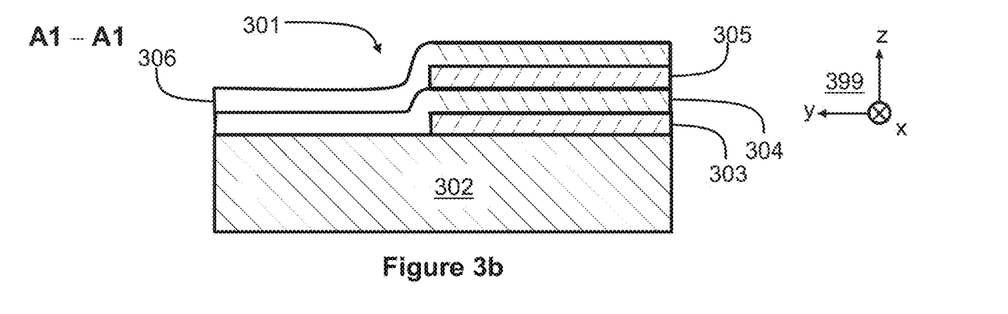
Figure 3C:
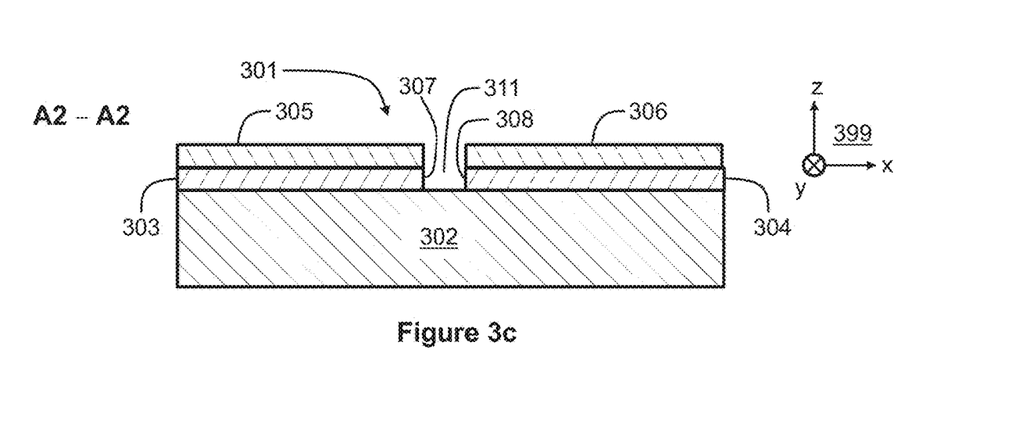

FIG. 3a shows a top view of an artifact 301 according to an exemplifying and non-limiting embodiment of the invention. FIG. 3b shows a view of a section taken along a line A1-A1 shown in FIG. 3a, and FIG. 3c shows a view of a section taken along a line A2-A2 shown in FIG. 3a. In FIG. 3b, the section plane is parallel with the yz-plane of a coordinate system 399. In FIG. 3c, the section plane is parallel with the xz-plane of the coordinate system 399. The artifact 301 comprises a substrate 302 and layers 303, 304, 305, and 306 on top of the substrate. The layers 303-304 are stacked on each other in a partially overlapping way so that edges 307, 308, 309, and 310 of the layers 303-306 are arranged to intersect with each other at a point of intersection 312 as illustrated in FIG. 3a.

The first one of the layers 303 is against the substrate 302, the second one of the layers 304 is partially against the substrate and partially against the layer 303, the third one of the layers 305 is partially against the layer 303 and partially against the layer 304, and the fourth one of the layers 306 is partially against the layer 304 and partially against the layer 305. In FIG. 3a, parts of the edges 307 and 309 which are covered by one or both of the layers 304 and 306 are depicted with a dashed line.

As seen in FIGS. 3a-3c, the layers 303-306 together with the substrate 302 constitute a 3D surface topography where a groove 311 defined by the above-mentioned edges tapers towards the point of intersection 312 between the edges.

As seen in FIGS. 3a and 2c, the first angle $\alpha_1$ that is between the edges 307 and 308 and opens towards the groove 311 is, when the artifact 301 is seen along the direction perpendicular to the layers, substantially coinciding with the second angle $\alpha_2$ that is between the edges 309 and 310 and opens towards the groove 311. Therefore, in the exemplifying artifact 301 illustrated in FIGS. 3a-3c, the depth of the groove 311 is increased by using more than two layers which are partially interleaved in the way illustrated in FIG. 3b.

Figure 4A:
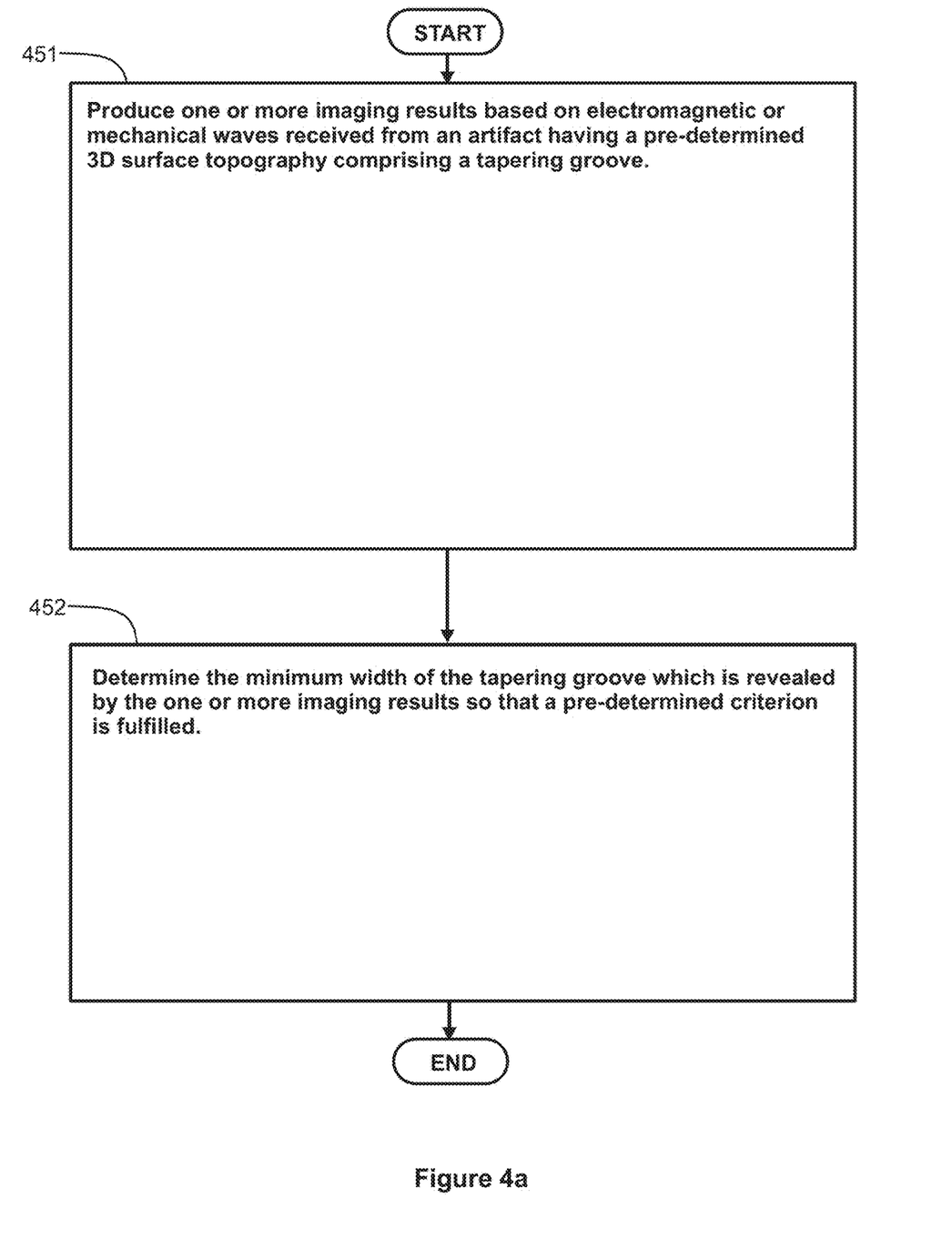
FIG. 4a shows a flowchart of a method according to an exemplifying and non-limiting embodiment of the invention for determining the resolution of imaging based on electromagnetic radiation and/or mechanical waves.

FIG. 4a shows a flowchart of a method according to an exemplifying and non-limiting embodiment of the invention for determining the resolution of imaging based on electromagnetic radiation and/or mechanical waves. The imaging can be, for example but not necessarily, interferometry based on interference between electromagnetic or mechanical waves reflected from an object being imaged and other electromagnetic or mechanical waves reflected from a reference reflector. The interferometry based on electromagnetic waves can e.g. be white-light interferometry "WLI", white-light polarization interferometry "WLPI", stroboscopic scanning white-light interferometry "SSWLI" and/or stroboscopic scanning white-light polarization interferometry "SSWLPI". Furthermore, the imaging based on electromagnetic radiation can represent a low coherence technique, a confocal technique, a phase shifting technique, an ellipsometry imaging technique, and/or a surface plasmon resonance imaging "SPRi" technique. The interferometry based on mechanical waves can be e.g. acoustic interference microscopy. Furthermore, the imaging based on mechanical waves can be e.g. ultrasound imaging such as e.g. ultrasound microscopy. Imaging that is based on both electromagnetic radiation and mechanical waves can be for example laser-ultrasonic imaging where laser is used for exciting mechanical vibrations for imaging.

The method comprises the following actions:
- action 451: producing one or more imaging results based on electromagnetic or mechanical waves received from an artifact according to an exemplifying embodiment of the invention, the artifact having a pre-determined three-dimensional "3D" surface topography comprising a tapering groove, and
- action 452: determining a minimum width of the tapering groove which is revealed by the one or more imaging results so that a pre-determined criterion is fulfilled, the determined minimum width being indicative of the resolution of the imaging based on electromagnetic radiation and/or mechanical waves.

The artifact can be, for example but not necessarily, such as the artifact 101 illustrated in FIGS. 1a-1c, or the artifact 201 illustrated in FIGS. 2a and 2b, or the artifact 301 illustrated in FIGS. 3a-3c. The above-mentioned criterion can be for example a requirement that the one or more imaging results reveal at least a pre-determined portion of the depth of the above-mentioned tapering groove.

Figure 4B:
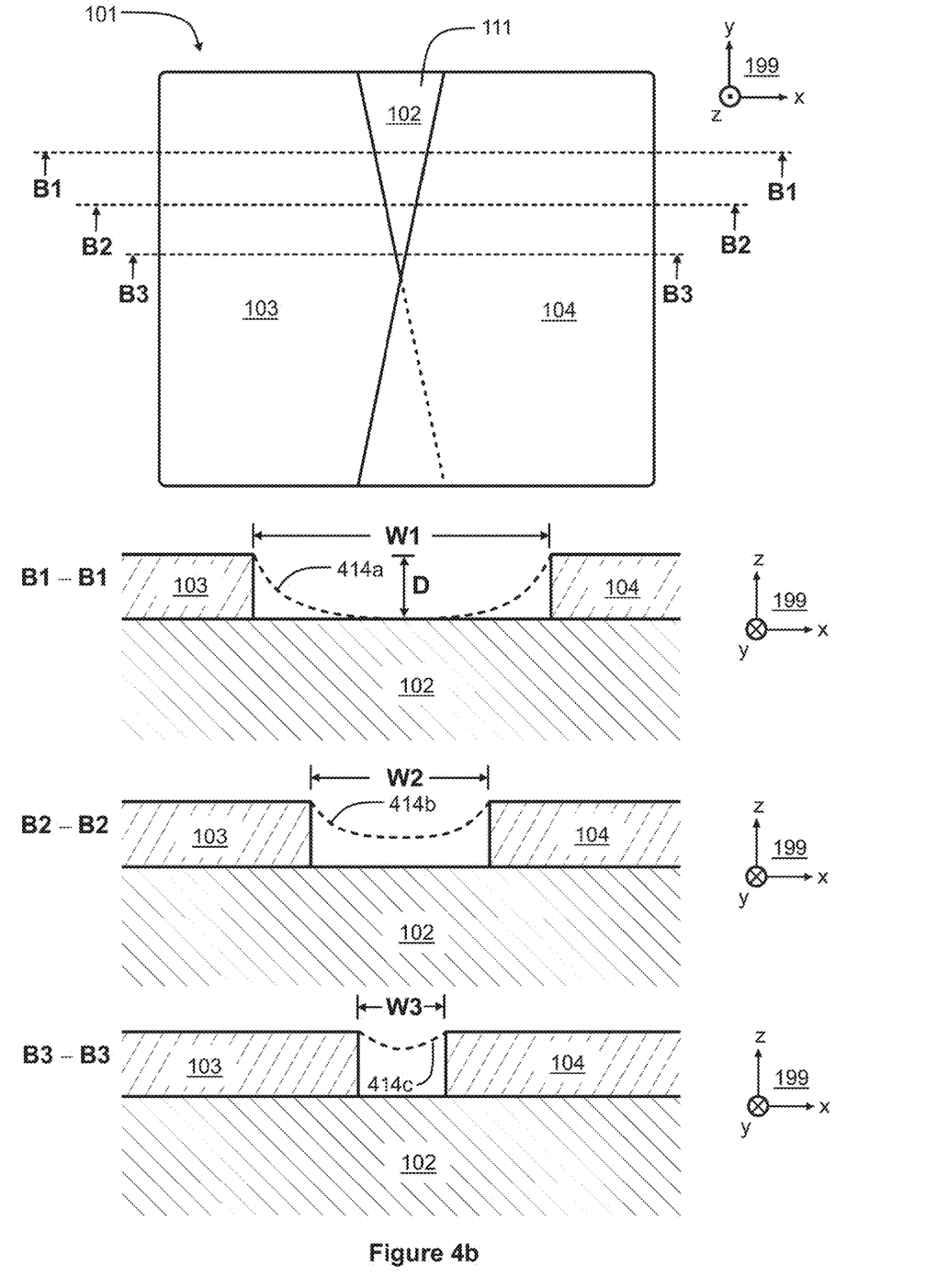
FIG. 4b illustrates determination of the resolution of the imaging based on electromagnetic radiation and/or mechanical waves.

FIG. 4b illustrates the determination of the resolution of the imaging based on electromagnetic radiation and/or mechanical waves. In this exemplifying case the artifact is the artifact 101 illustrated in FIGS. 1a-1c. FIG. 4b shows the top view of the artifact 101 and views of sections taken along lines B1-B1, B2-B2, and B3-B3 shown in FIG. 4b. The section planes corresponding to sections B1-B1, B2-B2, and B3-B3 are parallel with the xz-plane of the coordinate system 199. In FIG. 4b, the width of the tapering groove 111 in the section B1-B1 is denoted with W1, the width of the tapering groove 111 in the section B2-B2 is denoted with W2, and the width of the tapering groove 111 in the section B3-B3 is denoted with W3. In FIG. 4b, the depth of the tapering groove 111 is denoted with D. Dashed curves 414a, 414b, and 414c illustrate how the tapering groove 111 appears in the one or more imaging results based on the electromagnetic or mechanical waves received from the artifact 101. The dashed curve 414a illustrates that the one or more imaging results reveal 100% of the depth D of the tapering groove 111 when the width of the tapering groove is W1. The dashed curve 414b illustrates that the one or more imaging results reveal about 50% of the depth D of the tapering groove 111 when the width of the tapering groove is W2. The dashed curve 414c illustrates that the one or more imaging results reveal about 30% of the depth D of the tapering groove 111 when the width of the tapering groove is W3.

Thus, in a case where the above-mentioned criterion is a requirement to reveal at least 50% of the depth of the tapering groove, the resolution of the imaging is W2. Correspondingly, in a case where the above-mentioned criterion is a requirement to reveal at least 30% of the depth of the tapering groove, the resolution of the imaging is W3.

Figure 5:
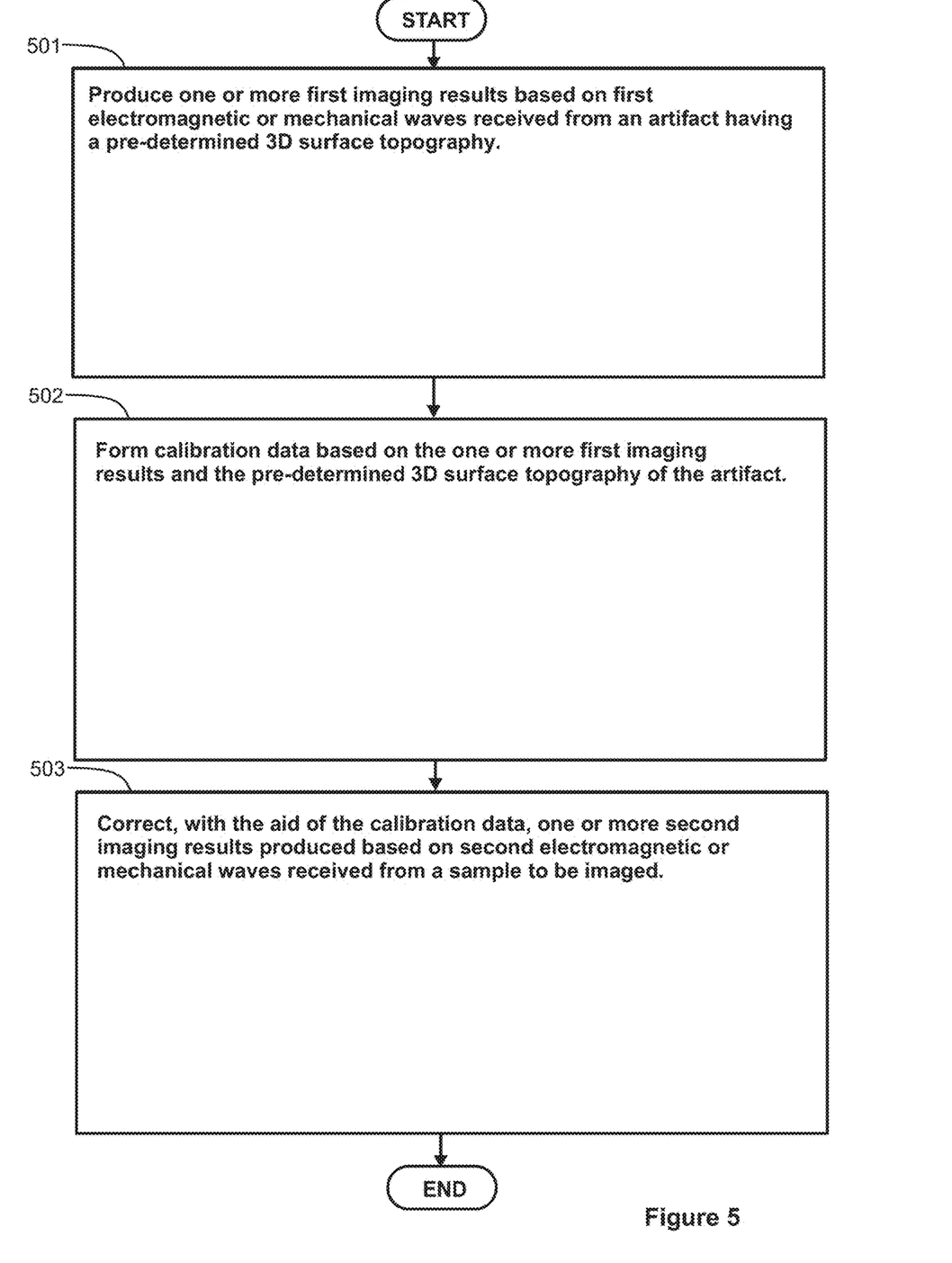
FIG. 5 shows a flowchart of a method according to an exemplifying and non-limiting embodiment of the invention for calibrating imaging based on electromagnetic radiation and/or mechanical waves.

FIG. 5 shows a flowchart of a method according to an exemplifying and non-limiting embodiment of the invention for calibrating imaging based on electromagnetic radiation and/or mechanical waves. The imaging can be, for example but not necessarily, interferometry based on interference between electromagnetic or mechanical waves reflected from an object being imaged and other electromagnetic or mechanical waves reflected from a reference reflector. The interferometry based on electromagnetic waves can e.g. be white-light interferometry "WLI", white-light polarization interferometry "WLPI", stroboscopic scanning white-light interferometry "SSWLI" and/or stroboscopic scanning white-light polarization interferometry "SSWLPI". Furthermore, the imaging based on electromagnetic radiation can represent a low coherence technique, a confocal technique, a phase shifting technique, an ellipsometry imaging technique, and/or a surface plasmon resonance imaging "SPRi" technique. The interferometry based on mechanical waves can be e.g. acoustic interference microscopy. Furthermore, the imaging based on mechanical waves can be e.g. ultrasound imaging such as e.g. ultrasound microscopy. Imaging that is based on both electromagnetic radiation and mechanical waves can be for example laser-ultrasonic imaging where laser is used for exciting mechanical vibrations for imaging.

The method comprises the following actions:

action 501: producing one or more first imaging results on based on first electromagnetic or mechanical waves received from an artifact according to an exemplifying embodiment of the invention, the artifact having a pre-determined three-dimensional "3D" surface topography, action 502: forming calibration data based on the one or more first imaging results and the pre-determined 3D surface topography of the artifact, and action 503: correcting, with the aid of the calibration data, one or more second imaging results produced on based on second electromagnetic or mechanical waves received from a sample to be imaged.

The artifact can be, for example but not necessarily, such as the artifact 101 illustrated in FIGS. 1*a*-1*c*, or the artifact 201 illustrated in FIGS. 2*a* and 2*b*, or the artifact 301 illustrated in FIGS. 3*a*-3*c*.

In a method according to an exemplifying and non-limiting embodiment of the invention, at least a part of the sample and at least a part of the artifact are located in a field-of-view "FOV" of the imaging when the above-mentioned first and second electromagnetic or mechanical waves are received from the artifact and from the sample. In a method according to an exemplifying and non-limiting embodiment of the invention, the first and second electromagnetic or mechanical waves are received concurrently from the artifact and from the sample.

Figure 6:
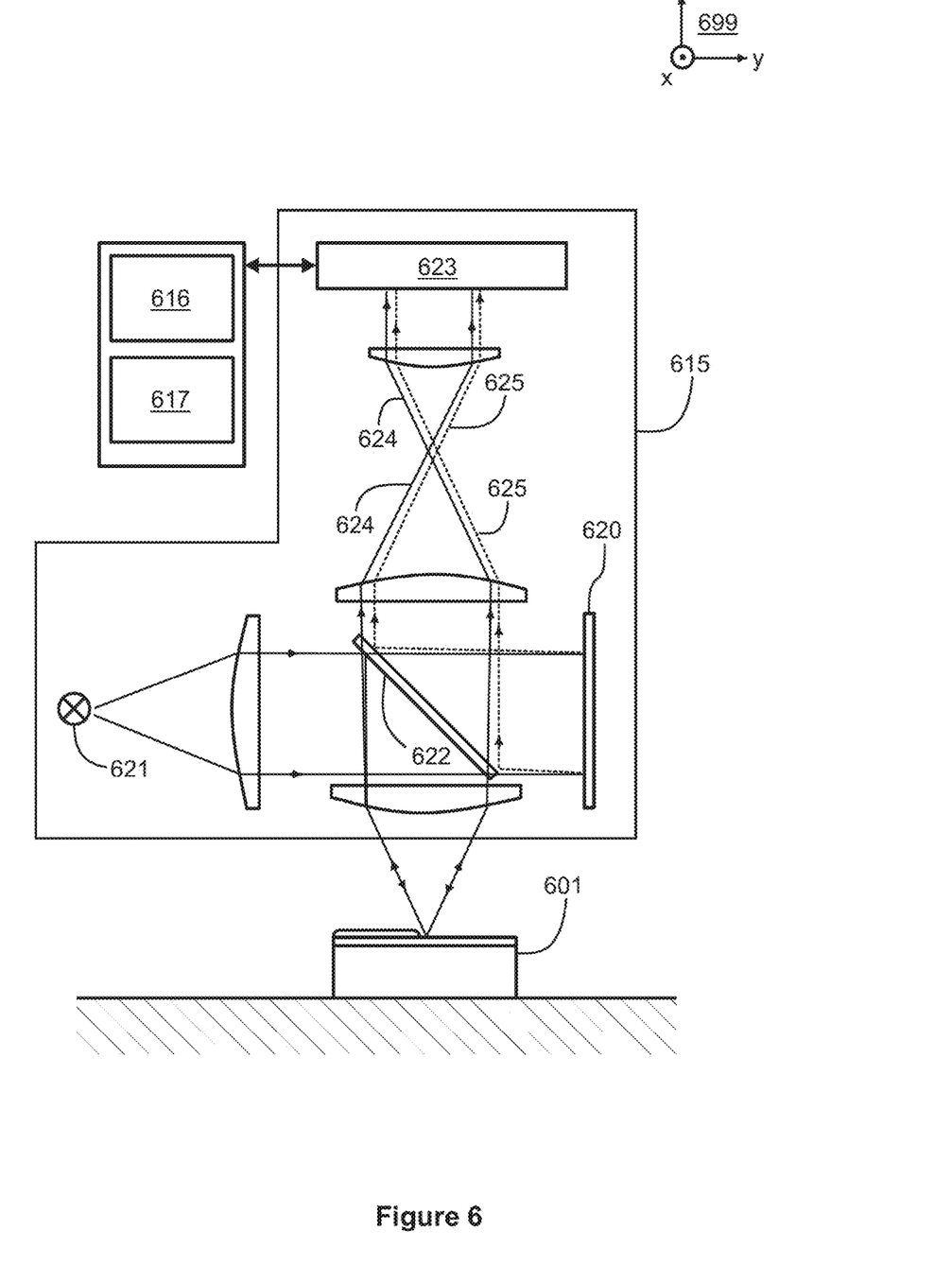
FIG. 6 shows a schematic illustration of a system according to an exemplifying and non-limiting embodiment of the invention for electromagnetic radiation-based imaging.

FIG. 6 shows a schematic illustration of a system according to an exemplifying and non-limiting embodiment of the invention for electromagnetic radiation-based three-dimensional "3D" imaging. The system comprises an artifact 601 that can be, for example but not necessarily, such as the artifact 101 illustrated in FIGS. 1*a*-1*c*, or the artifact 201 illustrated in FIGS. 2*a* and 2*b*, or the artifact 301 illustrated in FIGS. 3*a*-3*c*. The system comprises an imaging device 615 for producing one or more first imaging results based on first electromagnetic waves received from the artifact 601 and for producing one or more second imaging result based on second electromagnetic waves received from a sample being imaged. The sample is not shown in FIG. 6.

A system according to an exemplifying and non-limiting embodiment of the invention comprises processing equipment 616 for determining the minimum width of the tapering groove of the artifact 601 which can be revealed by the above-mentioned one or more first imaging results so that a pre-determined criterion is fulfilled. The determined minimum width is indicative of the resolution of the electromagnetic radiation-based imaging. The criterion can be for example a requirement that the one or more first imaging results is/are capable of revealing at least a pre-determined portion of the depth of the tapering groove where the depth is measured in the z-direction of a coordinate system 699.

A system according to an exemplifying and non-limiting embodiment of the invention comprises processing equipment 617 for calibrating the electromagnetic radiation-based imaging. The processing equipment 617 is configured to compare the above-mentioned one or more first imaging results to the known 3D surface topography of the artifact 601 so as to derive calibration data. The processing equipment 617 is configured to correct, with the aid of the derived calibration data, the above-mentioned one or more second imaging results to correspond to e.g. the surface relief of the imaged sample with a sufficient accuracy. The calibration data can be e.g. in the form of a lookup table and/or a correction equation with the aid of which the one or more second imaging results can be corrected.

In the exemplifying system illustrated in FIG. 6, the imaging device 615 is an interferometer that comprises a light source 621, a dichroic mirror 622, a reference reflector 620, and an imaging sensor 623 that can be e.g. a charge-coupled device "CCD" sensor. Furthermore, the imaging device 615 comprises lenses for focusing and collimating light in desired ways. In cases where the calibration artifact 601 and samples to be imaged are immersed in liquid e.g. immersion oil, the imaging device 615 comprises advantageously the Michelson or Linnik compensation arrangement for compensating imaging errors that would be otherwise caused by the immersing. Imaging in the z-direction of the coordinate system 699 is based on the interference between electromagnetic waves reflected from the calibration artifact 601 and other electromagnetic waves reflected from the reference reflector 620. In FIG. 6, the propagation of the electromagnetic waves reflected from the calibration artifact 601 is depicted with lines 624 and the propagation of the electromagnetic waves reflected from the reference reflector 620 is depicted with dashed lines 625. The interferometer can be e.g. a white-light interferometer "WLI", a white-light polarization interferometer "WPLI", and/or a stroboscopic scanning white-light interferometer "SSWLI".

The processing equipment 616 and the processing equipment 617 shown in FIG. 6 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 7:
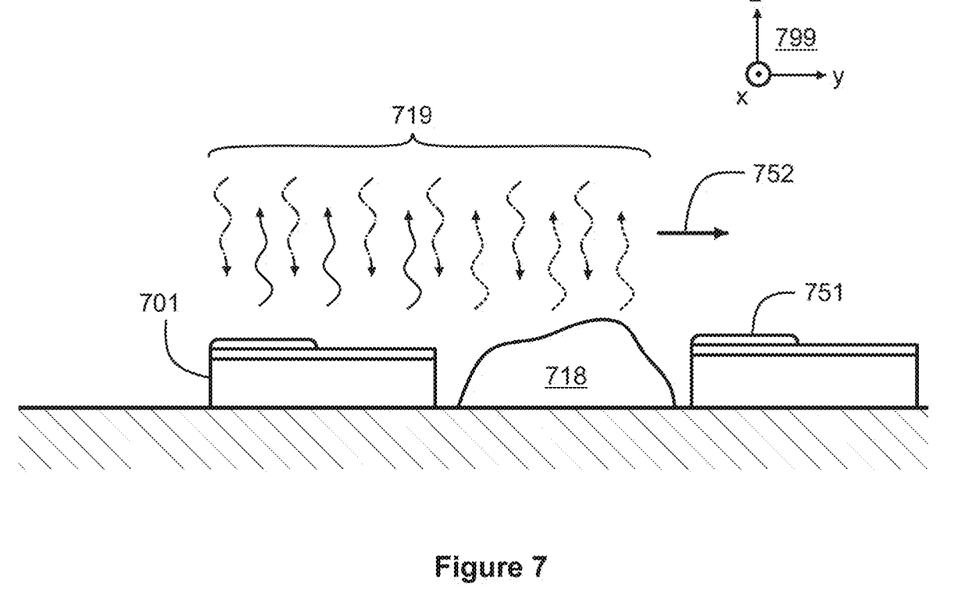
FIG. 7 illustrates a part of a system according to an exemplifying and non-limiting embodiment of the invention for electromagnetic radiation-based imaging.

FIG. 7 illustrates a part of a system according to an exemplifying and non-limiting embodiment of the invention for electromagnetic radiation-based imaging.

An imaging device of the system is not shown in FIG. 7. The imaging device can be for example such as the imaging device 615 illustrated in FIG. 6. The imaging device is configured to produce one or more first imaging results based on first electromagnetic waves received from an artifact 701 and one or more second imaging results based on second electromagnetic waves received from a sample 718 to be imaged. The artifact 701 can be, for example but not necessarily, such as the artifact 101 illustrated in FIGS. 1*a*-1*c*, or the artifact 201 illustrated in FIGS. 2*a* and 2*b*, or the artifact 301 illustrated in FIGS. 3*a*-3*c*. The imaging device is configured to produce the one or more first imaging results and the one or more second imaging results in a situation in which the artifact 701 and the sample 718 are located adjacent to each other as illustrated in FIG. 7. Therefore, the artifact 701 and the sample 718 do not need to be moved with respect to each other when producing the one or more first imaging results related to the artifact 701 and the one or more second imaging results related to the sample 718. As a corollary, the production circumstances of the one or more first imaging results correspond in a reliable way to the production circumstances of the one or more second imaging results. This improves the accuracy when the one or more first imaging results related to the artifact 701 are used for correcting the one or more second imaging results related to the sample 718, i.e. the calibration accuracy is improved. In FIG. 7, the electromagnetic waves propagating towards the artifact 701 and the sample 718 are depicted with dash-and-dot line wavy arrows, the electromagnetic waves reflected from the artifact 701 are depicted with solid line wavy arrows, and the electromagnetic waves reflected from sample 718 are depicted with dashed line wavy arrows.

Advantageously, at least a part of the sample 718 and at least a part of the artifact 701 are located concurrently in the field-of-view "FOV" 719 of the imaging device. In this case, the one or more first imaging results related to the artifact 701 and the one or more second imaging results related to the sample 718 belong to a same image, which improves the calibration accuracy. This approach provides instantaneous calibration which is advantageous especially in cases where a large stitched image is constructed so that the field-of-view "FOV" 719 of the imaging device is moving with respect to the sample 718 and the artifact 701. The system can be provided with many artifacts in order to provide appropriate calibration in different positions of the field-of-view "FOV" 719. In the exemplifying case illustrated in FIG. 7, there is another artifact 751 and the FOV 719 is moving in the positive y-direction of a coordinate system 799. The FOV movement is depicted with an arrow 752.

Figure 8:
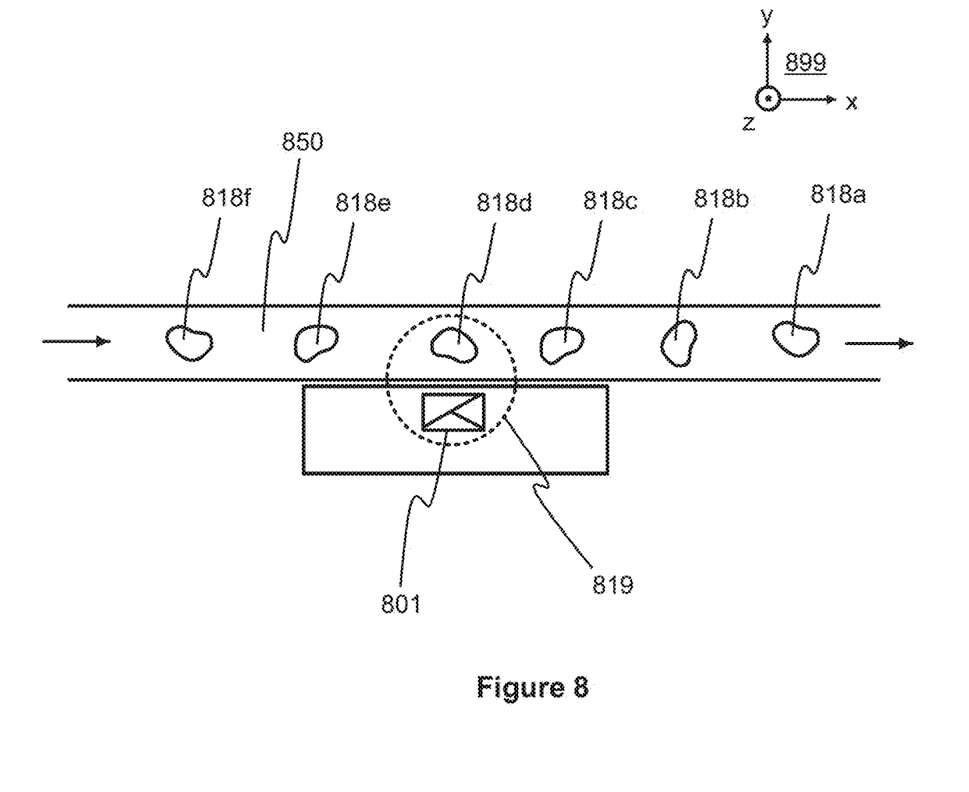
FIG. 8 illustrates a part of a system according to an exemplifying and non-limiting embodiment of the invention for electromagnetic radiation-based imaging.

FIG. 8 illustrates a part of a system according to an exemplifying and non-limiting embodiment of the invention for electromagnetic radiation-based imaging. The system is configured to carry out the electromagnetic radiation-based imaging for many samples one by one. In FIG. 8, six of the samples are denoted with figure references 818a, 818b, 818c, 818d, 818e, and 818f. The samples are moved in the positive x-direction of a coordinate system 899 with the aid of a conveyance device 850. In this exemplifying case, the conveyance device 850 is a conveyor belt. This is, however, not the only possible choice. For example, it is also possible to use a rotating table for moving the samples so that each of the samples is in its turn in the field-of-view "FOV" 819 of an imaging device of the system. The imaging device is not shown in FIG. 8. The imaging device can be for example such as the imaging device 615 illustrated in FIG. 6. In the exemplifying situation shown in FIG. 8, the sample 818d is in the field-of-view "FOV" 819. The system comprises an artifact 801 that is also in the field-of-view "FOV" 819 of the imaging device. As the sample under consideration and the artifact 801 belong to a same image, accurate imaging can be achieved. The artifact 801 can be, for example but not necessarily, such as the artifact 101 illustrated in FIGS. 1a-1c, or the artifact 201 illustrated in FIGS. 2a and 2b, or the artifact 301 illustrated in FIGS. 3a-3c.

FIGS. 6, 7, and 8 illustrate exemplifying systems for electromagnetic radiation-based imaging. Correspondingly, a system according to an exemplifying and non-limiting embodiment of the invention for mechanical wave-based imaging comprises:
an artifact according to an embodiment of the invention and having a pre-determined 3D surface topography comprising a tapering groove, and
an imaging device for producing one or more first imaging results based on first mechanical waves received from the artifact and for producing one or more second imaging result based on second mechanical waves received from a sample to be imaged.

The artifact can be, for example but not necessarily, such as the artifact 101 illustrated in FIGS. 1a-1c, or the artifact 201 illustrated in FIGS. 2a and 2b, or the artifact 301 illustrated in FIGS. 3a-3c. The imaging device can be e.g. an ultrasound imaging device e.g. an ultrasound microscope. Furthermore, the imaging device can be e.g. interferometer based on mechanical waves, e.g. an acoustic interference microscope.

A system according to an exemplifying and non-limiting embodiment of the invention for mechanical wave-based imaging comprises processing equipment for determining a minimum width of the tapering groove which is revealed by the one or more first imaging results so that a pre-determined criterion is fulfilled, where the determined minimum width is indicative of the resolution of the imaging. The pre-determined criterion can be e.g. a requirement that the one or more imaging results reveal at least a pre-determined portion of a depth of the tapering groove.

A system according to an exemplifying and non-limiting embodiment of the invention for mechanical wave-based imaging comprises processing equipment for:
forming calibration data based on the one or more first imaging results and the pre-determined three-dimensional surface topography of the artifact, and
correcting, with the aid of the calibration data, the one or more second imaging results.

In a system according to an exemplifying and non-limiting embodiment of the invention for mechanical wave-based imaging, the imaging device is configured to produce the one or more first imaging results and to produce the one or more second imaging results in a situation in which at least a part of the sample and at least a part of the artifact are located in a field-of-view of the imaging.

In a system according to an exemplifying and non-limiting embodiment of the invention for mechanical wave-based imaging, the imaging device is configured to receive the first and second mechanical waves concurrently from the artifact and from the sample.

The non-limiting, specific examples provided in the description given above should not be construed as limiting the scope and/or the applicability of the appended claims. Furthermore, any list or group of examples presented in this document is not exhaustive unless otherwise explicitly stated.

What is claimed is:

1. An artifact for determining resolution of imaging based on electromagnetic radiation, mechanical waves, or both electromagnetic radiation and mechanical waves, the artifact comprising:
a substrate, and
layers on top of the substrate, the layers comprising organic material,
wherein at least two of the layers are stacked on each other in a partially overlapping way so that an edge of a first one of the layers is arranged to intersect with an edge of a second one of the layers, the layers constituting a three-dimensional surface topography where, when the artifact is seen along a direction perpendicular to the layers, a groove defined by the edges of the first and second ones of the layers is tapering towards a point of intersection between the edges.

2. An artifact according to claim 1, wherein each of the layers is a Langmuir-Blodgett film.

3. An artifact according to claim 1, wherein the substrate is made of highly ordered pyrolytic graphite substrate.

4. An artifact according to claim 1, wherein the first one of the layers is on the substrate in contact with substrate, the second one of the layers is partially on the substrate in contact with the substrate and partially on the first one of the layers in contact with the first one of the layers, and an angle between the edges and opening towards the groove is in the range from 5 degrees to 90 degrees.

5. An artifact according to claim 1, wherein the first one of the layers is on the substrate in contact with substrate, the second one of the layers is partially on the substrate in contact with substrate and partially on the first one of the layers in contact with the first one of the layers, a third one of the layers is partially on the first one of the layers in contact with the first one of the layers and partially on the second one of the layers in contact with the second one of the layers, and a fourth one of the layers is partially on the second one of the layers in contact with the second one of the layers and partially against the third one of the layers in contact with the third one of the layers.

6. An artifact according to claim 5, wherein a first angle between the edges of the first and second ones of the layers and opening towards the groove is, when the artifact is seen along the direction perpendicular to the layers, inside a second angle between edges of the third and fourth ones of the layers and opening towards the groove.

7. An artifact according to claim 5, wherein the point of intersection between the edges of the first and second ones of the layers is, when the artifact is seen along the direction perpendicular to the layers, substantially at a same location as a point of intersection between edges of the third and fourth ones of the layers.

8. An artifact according to claim 5, wherein a first angle between the edges of the first and second ones of the layers and opening towards the groove is, when the artifact is seen along the direction perpendicular to the layers, substantially coinciding with a second angle between edges of the third and fourth ones of the layers and opening towards the groove.

9. A method for determining resolution of imaging based on electromagnetic radiation, mechanical waves, or both electromagnetic radiation and mechanical waves, the method comprising:
    producing one or more imaging results based on electromagnetic or mechanical waves received from an artifact having a pre-determined three-dimensional surface topography comprising a tapering groove, and
    determining a minimum width of the tapering groove which is revealed by the one or more imaging results so that a pre-determined criterion is fulfilled, the determined minimum width being indicative of the resolution of the imaging,
    wherein the artifact comprises:
    a substrate, and
    layers on top of the substrate, the layers comprising organic material,
    wherein at least two of the layers are stacked on each other in a partially overlapping way so that an edge of a first one of the layers is arranged to intersect with an edge of a second one of the layers, the layers constituting the pre-determined three-dimensional surface topography comprising the tapering groove so that, when the artifact is seen along a direction perpendicular to the layers, the groove is defined by the edges of the first and second ones of the layers and the groove is tapering towards a point of intersection between the edges.

10. A method according to claim 9, wherein the pre-determined criterion is that the one or more imaging results reveal at least a pre-determined portion of a depth of the tapering groove.

11. A method according to claim 9, wherein the imaging is one of the following: i) ultrasound microscopy, ii) low coherence imaging, iii) confocal imaging, iv) phase shifting imaging, v) ellipsometry imaging, vi) surface plasmon resonance imaging, vii) laser-ultrasonic imaging, viii) interferometry based on interference between electromagnetic or mechanical waves reflected from the artifact and other electromagnetic or mechanical waves reflected from a reference reflector.

12. A method according to claim 11, wherein the interferometry is at least one of the following: white-light interferometry, white-light polarization interferometry, stroboscopic scanning white-light interferometry, stroboscopic scanning white-light polarization interferometry.

13. A method for calibrating imaging based on electromagnetic radiation, mechanical waves, or both electromagnetic radiation and mechanical waves, the method comprising:
    producing one or more first imaging results based on first electromagnetic or mechanical waves received from an artifact having a pre-determined three-dimensional surface topography,
    forming calibration data based on the one or more first imaging results and the pre-determined three-dimensional surface topography of the artifact, and
    correcting, with the aid of the calibration data, one or more second imaging results produced based on second electromagnetic or mechanical waves received from a sample to be imaged,
    wherein the artifact comprises:
    a substrate, and
    layers on top of the substrate, the layers comprising organic material,
    wherein at least two of the layers are stacked on each other in a partially overlapping way so that an edge of a first one of the layers is arranged to intersect with an edge of a second one of the layers, the layers constituting the pre-determined three-dimensional surface topography where, when the artifact is seen along a direction perpendicular to the layers, a groove defined by the edges of the first and second ones of the layers is tapering towards a point of intersection between the edges.

14. A method according to claim 13, wherein at least a part of the sample and at least a part of the artifact are located in a field-of-view of the imaging when the first and second electromagnetic or mechanical waves are received from the artifact and from the sample.

15. A method according to claim 14, wherein the first and second electromagnetic or mechanical waves are received concurrently from the artifact and from the sample.

16. A method according to claim 13, wherein the imaging is one of the following: i) ultrasound microscopy, ii) interferometry based on interference between electromagnetic or mechanical waves reflected from an object being imaged and other electromagnetic or mechanical waves reflected from a reference reflector.

17. A method according to claim 16, wherein the interferometry is at least one of the following: white-light interferometry, white-light polarization interferometry, stroboscopic scanning white-light interferometry, stroboscopic scanning white-light polarization interferometry, acoustic interference microscopy.

18. A system for imaging based on electromagnetic radiation, mechanical waves, or both electromagnetic radiation and mechanical waves, the system comprising:
    an artifact having a pre-determined three-dimensional surface topography comprising a tapering groove, and
    an imaging device for producing one or more first imaging results based on first electromagnetic or mechanical waves received from the artifact and for producing one or more second imaging result based on second electromagnetic or mechanical waves received from a sample to be imaged,
    wherein the artifact comprises:
    a substrate, and
    layers on top of the substrate, the layers comprising organic material, wherein at least two of the layers are stacked on each other in a partially overlapping way so that an edge of a first one of the layers is arranged to intersect with an edge of a second one of the layers, the layers constituting the pre-determined three-dimensional surface topography comprising the tapering groove so that, when the artifact is seen along a direction perpendicular to the layers, the groove is defined by the edges of the first and second ones of the layers and the groove is tapering towards a point of intersection between the edges.

19. A system according to claim 18, wherein the system comprises processing equipment for determining a minimum width of the tapering groove which is revealed by the one or more first imaging results so that a pre-determined criterion is fulfilled, the determined minimum width being indicative of resolution of the imaging.

20. A system according to claim 19, wherein the pre-determined criterion is a requirement that the one or more imaging results reveal at least a pre-determined portion of a depth of the tapering groove.

21. A system according to claim 18, wherein the system comprises processing equipment for:

forming calibration data based on the one or more first imaging results and the pre-determined three-dimensional surface topography of the artifact, and correcting, with the aid of the calibration data, the one or more second imaging results.

22. A system according to claim 21, wherein the imaging device is configured to produce the one or more first imaging results and to produce the one or more second imaging results in a situation in which at least a part of the sample and at least a part of the artifact are located in a field-of-view of the imaging.

23. A system according to claim 22, wherein the imaging device is configured to receive the first and second electromagnetic or mechanical waves concurrently from the artifact and from the sample.

24. A system according to claim 18, wherein the imaging device is at least one of the following: i) ultrasound microscope, ii) a low coherence imaging device, iii) a confocal imaging device, iv) a phase shifting imaging device, v) an ellipsometry imaging device, vi) a surface plasmon resonance imaging device, vii) a laser-ultrasonic imaging device, viii) an interferometer configured to carry out imaging based on interference between electromagnetic or mechanical waves reflected from an object being imaged and other electromagnetic or mechanical waves reflected from a reference reflector.

25. A system according to claim 24, wherein the interferometer is at least one of the following: white-light interferometer, white-light polarization interferometer, stroboscopic scanning white-light interferometer, stroboscopic scanning white-light polarization interferometry, acoustic interference microscope.

26. An artifact according to claim 6, wherein the point of intersection between the edges of the first and second ones of the layers is, when the artifact is seen along the direction perpendicular to the layers, substantially at a same location as a point of intersection between edges of the third and fourth ones of the layers.

27. A method according to claim 10, wherein the imaging is one of the following: i) ultrasound microscopy, ii) low coherence imaging, iii) confocal imaging, iv) phase shifting imaging, v) ellipsometry imaging, vi) surface plasmon resonance imaging, vii) laser-ultrasonic imaging, viii) interferometry based on interference between electromagnetic or mechanical waves reflected from the artifact and other electromagnetic or mechanical waves reflected from a reference reflector.

* * * * *